United States Patent [19]

Le Salver et al.

[11] 3,957,128
[45] May 18, 1976

[54] SUSPENSION DEVICE FOR THE BODY AND ENGINE OF AN AUTOMOBILE VEHICLE

[75] Inventors: Robert Le Salver, Chaneteloup-les-Vignes; Dominique Poupard, Courbevoie, both of France

[73] Assignees: Automobiles Peugeot, Paris; Regie Nationale des Usines Renault, Boulogne-Billancourt, both of France

[22] Filed: May 22, 1975

[21] Appl. No.: 579,851

[30] Foreign Application Priority Data

May 27, 1974 France .............. 74.18263

[52] U.S. Cl. .............................. 180/64 R; 280/678
[51] Int. Cl.² ................. B60K 9/00; B60G 21/00
[58] Field of Search ................. 180/64 R, 63; 280/124 F; 248/9

[56] References Cited
UNITED STATES PATENTS

| | | |
|---|---|---|
| 2,705,118 | 3/1955 | Beck ............................... 180/64 R |
| 3,014,714 | 12/1961 | Trevaskis ........................ 280/124 F |
| 3,088,726 | 5/1963 | Dangauthier .................... 280/124 F |
| 3,137,466 | 6/1964 | Rasmussen ...................... 280/124 F |
| 3,165,161 | 1/1965 | Nallinger ......................... 180/64 R |
| 3,395,769 | 8/1968 | Julien .............................. 180/64 R |
| 3,547,466 | 12/1970 | Millican .......................... 280/124 F |
| 3,778,681 | 12/1973 | Takahashi et al. ............... 280/124 F |
| 3,873,122 | 3/1975 | Fischer ........................... 280/124 F |
| 3,892,424 | 7/1975 | Takahashi et al. ............... 280/124 F |
| 3,909,035 | 9/1975 | Aikawa ........................... 280/124 F |

*Primary Examiner*—M. H. Wood, Jr.
*Assistant Examiner*—David M. Mitchell
*Attorney, Agent, or Firm*—Burns, Doane, Swecker & Mathis

[57] ABSTRACT

The suspension device tends to eliminate the vibrations due to movements between the engine and the body.

The body is connected to each shockabsorber by a chamber having a variable volume and a wall constituted by an elastically yieldable block whereas the engine is connected to the body through other variable volume chambers, each chamber being connected to the adjacent chamber by a pipe and the assembly being filled with an incompressible fluid.

18 Claims, 10 Drawing Figures

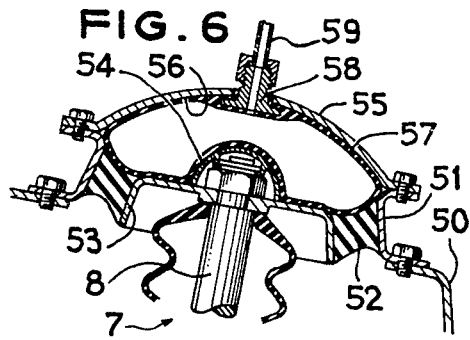
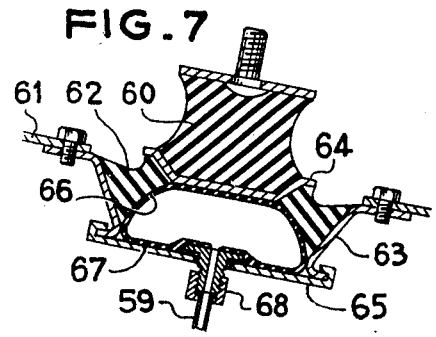
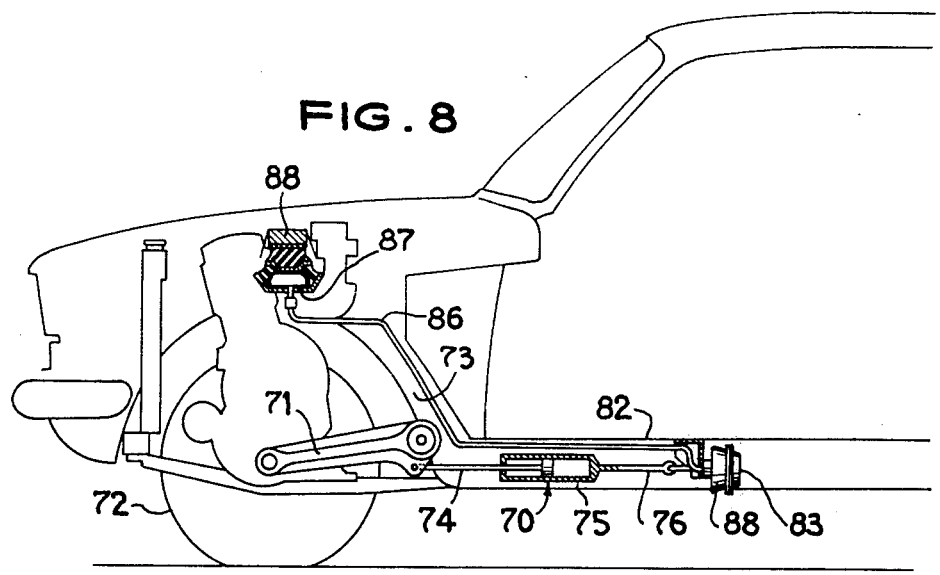
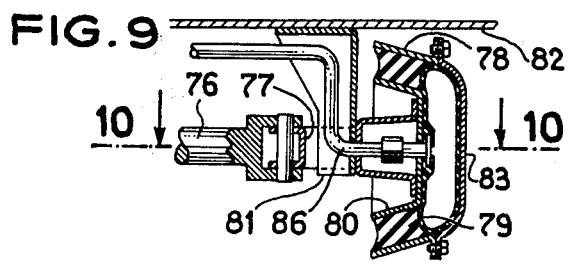
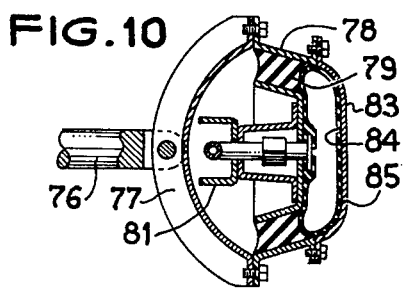

SUSPENSION DEVICE FOR THE BODY AND ENGINE OF AN AUTOMOBILE VEHICLE

The present invention relates to devices for suspending the body and the engine of an automobile vehicle.

It is known that it is impossible to obtain an absolutely perfect dynamic balancing of a heat engine. This is why it is desirable to support the engine-drive unit by elastically yieldable blocks which have a rigidity which is as low as possible in order to transmit the minimum of vibratory forces to the body. Now, due to unevenness of the road, the wheels of the vehicle produce through the shock-absorbing support devices forces in the body which result in relative movements between the engine and the body which are as large as the blocks suspending the engine are flexible. These relative movements then considerably impair the comfort under the effect of the trembling produced.

An object of the invention is to overcome this drawback by permitting the use of flexible blocks for supporting the engine so as to achieve a good filtering of the vibrations and of the drumming noise due to the imperfect balancing of the engine while eliminating vibrations due to movements between the engine and the body under the effect of unevenness of the road and maintaining a good guiding of the wheels.

According to the invention, there is provided a device for suspending the body and the engine unit in an automobile vehicle, of the type in which each wheel is associated with a telescopic shock-absorber connected to the body through an elastically yieldable attachment and to the wheels through a suspension mechanism, the engine being itself supported elastically by the body, wherein a first chamber of variable volume is disposed between the body and the adjacent part of the shock-absorber, the engine unit bearing on the body through at least one second chamber of variable volume which is connected to the first chamber by a connecting pipe, the two chambers and the pipe being filled with an incompressible fluid.

Preferably, there are provided between the engine and the body two chambers respectively connected to one of the two chambers associated with the shock-absorbers of two adjacent wheels.

According to another feature of the invention, the two chambers associated with the engine are interconnected by a pipe in which there is placed a jet whose section is preferably adjustable.

In this way, the vertical movements of the wheels due to the unevenness of the road, impress, simultaneously and hydraulically, accelerations in the same direction both on the body and on the engine owing to the incompressibility of the liquid. Consequently, the movements of the engine with respect to the body are considerably reduced.

In order to facilitate assembly and improve reliability there are preferably provided the two associated chambers and their connecting pipe in the form of a subassembly, detachable means being provided for receiving and maintaining the two chambers.

Further features of the invention will be apparent from the ensuing description with reference to the accompanying drawings in which:

FIGS. 6 and 7 are sectional views of a detail of another embodiment;

FIG. 8 is a side elevational view of a vehicle having horizontal shock-absorbers equipped with the device according to the invention, and FIGS. 9 and 10 are sectional views to an enlarged scale of the arrangement shown in FIS. 8, FIG. 10 corresponding to a section taken on line 10—10 of FIG. 9.

FIG. 1 shows the front end of an automobile vehicle and an engine 1 disposed longitudinally between the front wheels 2.

Figure 1:
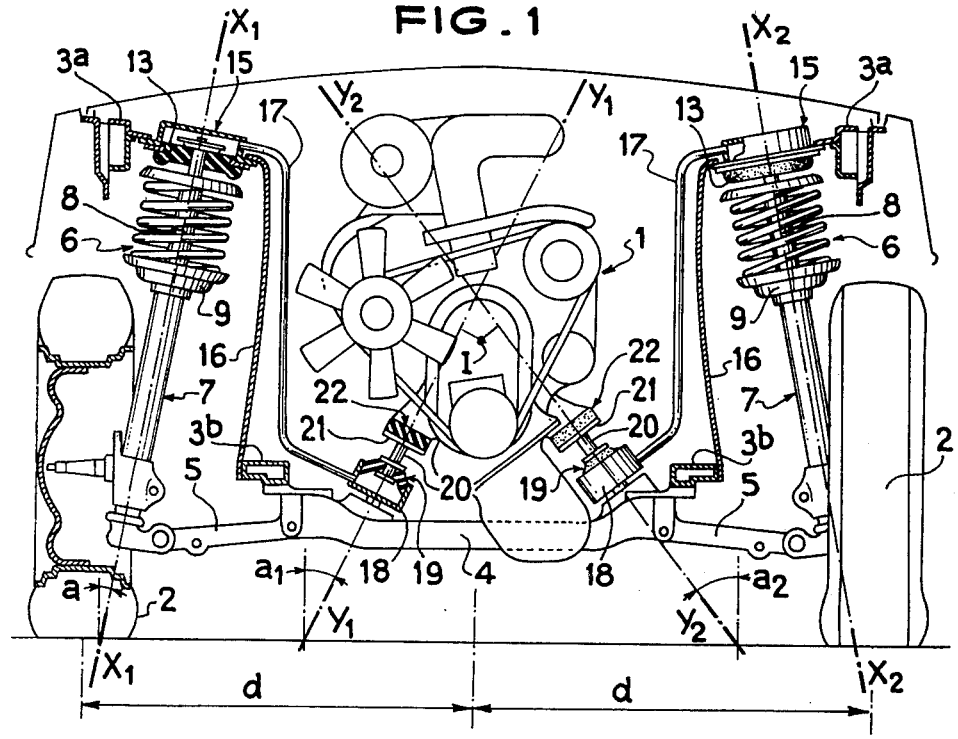
FIG. 1 is a diagrammatic front elevational view of a suspension according to the invention.
Figure 2:
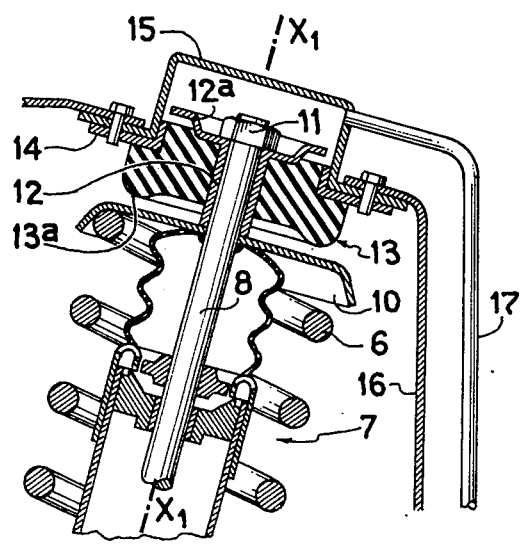
FIG. 2 is a detail view to an enlarged scale of a part of FIG. 1.

The structure of the vehicle, integral with the body, is shown in particular by the longitudinal members $3^a$, $3^b$ and a cradle 4.

Considering one side of the set of wheels, bearing in mind that the other side comprises similar elements, it can be seen that the wheel 2 is connected to the body by lower arms or triangles 5 pivoted to the cradle 4 and moreover by an assembly comprising a coil spring 6 and a telescopic shock-absorber 7 provided with a sliding rod 8.

Blocked on the upper end portion of the rod 8 between a cup 10 and a nut 11 is a sleeve 12 around which there is bonded an elastically yieldable block 13 which is also bonded to a flange 14. The sleeve 12 terminates in a cup $12^a$ which cooperates with the block 13 and serves to limit the downward travel of the rod of the shock-absorber with respect to the body. The block 13 has a beading $13^a$ which cooperates with the cup 10 and serves to limit the upward travel of the rod 8 of the shock-absorber with respect to the body.

The elastically yieldable block 13 constitutes the movable lower wall of a chamber 16 which is secured to the wing lining 16. The chamber 15 is connected by a pipe 17 to a second chamber 18 integral with the cradle 4. The chamber 18 is closed in its upper part by a membrane 19 of low rigidity to which there is fixed a rod 20 which terminates in an armature 21 which is connected by an elastically yieldable block 22 to the engine 1. The plane of the membrane 19 is perpendicular to an axis $Y_1$—$Y_1$ located in a plane which is roughly transverse with respect to the vehicle and which will be defined more precisely hereinafter.

The assembly comprising the two chambers 15 and 18 located on the same side of the vehicle and the connecting pipe 17 is filled with an incompressible liquid such as oil or water.

With the arrangement just described it can be seen that any force exerted on the rod 8 of the shock-absorber is simultaneously transferred, on one hand, to the body and, on the other, to the engine through the liquid contained in the chambers 15 and 18.

Preferably, the dimensions of the chambers 15 and 18 and the inclinations of the axes $Y_1$—$Y_1$ and $Y_2$—$Y_2$ are so chosen that the ratio between the mass impedance of the body in the region of the axle and the mass impedance of the engine in the region of the block 22 is equal to:

$$\left(\frac{l_1}{l_2} \times \frac{s}{s_1 \cos a_1}\right) - 1 \text{ or } \left(\frac{l_1}{l_2} \times \frac{s}{s_2 \cos a_2}\right) - 1$$

in which:
- s is the section of a piston which, if substituted for the block 13, would result in the same variation in volume in the chamber 16 for the same travel of the rod 8 of the shock-absorber;
- $s_1$ or $s_2$ is the section of a piston which, if substituted for the membrane 19, would result in the same travel of the rod 20 for the same variation in volume in the chamber 18;
- $a_1$, $a_2$ are the angles made by the axes $Y_1$—$Y_1$ and $Y_2$—$Y_2$ with the vertical, and
- $l_1/l_2$ is the ratio between the travel of the shock-absorber and the corresponding vertical movement of the wheel. The disclosure of our compending application, Ser. No. 558,358 filed Mar. 14, 1975, is hereby incorporated herein for its definition of mass impedance.

If this expression is satisfied, the vertical accelerations caused by unevenness in the road are constantly equal for the body and the engine.

Also, preferably, this respective distance between the axes $Y_1$—$Y_1$ or $Y_2$—$Y_2$ and the longitudinal axis I through the centre of gravity of the engine is given by the following expression:

$$d_1 = d \, \frac{I_m}{I_m + I_c} \times \frac{l_1}{l_2} \times \frac{s}{s_1} \text{ or } d_2 = d \, \frac{I_m}{I_m + I_c} \times \frac{l_1}{l_2} \times \frac{s}{s_2}$$

in which :
- $d$ = half the track of the set of wheels between which the engine is placed;
- Im = the inertia of the engine about a longitudinal axis through the centre of gravity of the engine;
- Ic = the inertia of the body about a longitudinal axis through the centre of gravity of the body.

In this way, the angular accelerations produced by unevenness in the road are equal for the engine and the body.

It must also be stressed that the presence of the cup $12^a$ and the beadings $13^a$ permits limiting the extent of the movements of the shock-absorber rod to a value of about ±3 mm, for low-frequency movements or under the effect of practically static forces produced when braking or when the vehicle travels round a bend. In this way, the movements of the engine are also limited.

Figure 3:
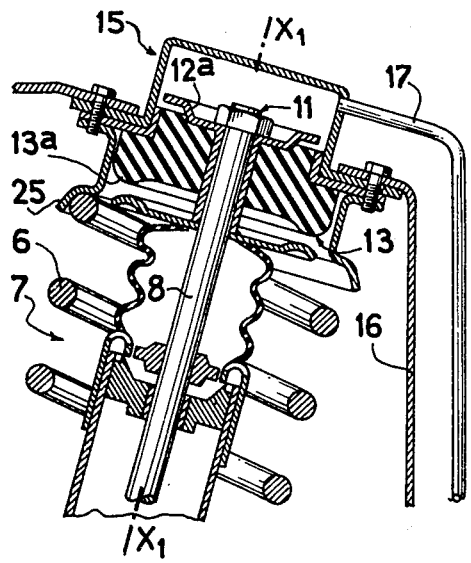
FIG. 3 is a view similar to FIG. 2 in respect of an embodiment.
Figure 4:
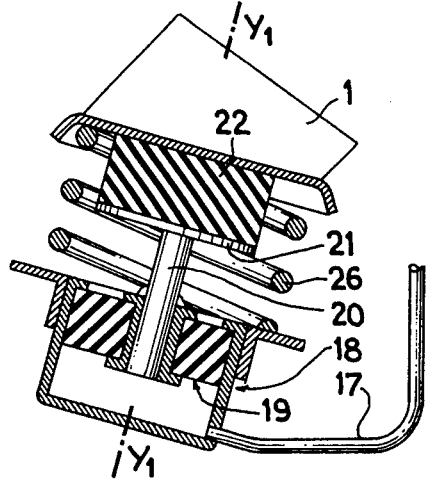
FIG. 4 shows a modification of a detail shown in FIG. 1.

In the modification shown in FIGS. 3 and 4, the spring 6 bears in its upper part against a cup 25 which is directly fixed to the wing lining 16 (FIG. 3) and a spring 26 interposed between the engine 1 and the chamber 18 (FIG. 4).

This modification has all the advantages of the first arrangement while is also avoids putting the liquid under pressure under the effect of static loads.

Figure 5:
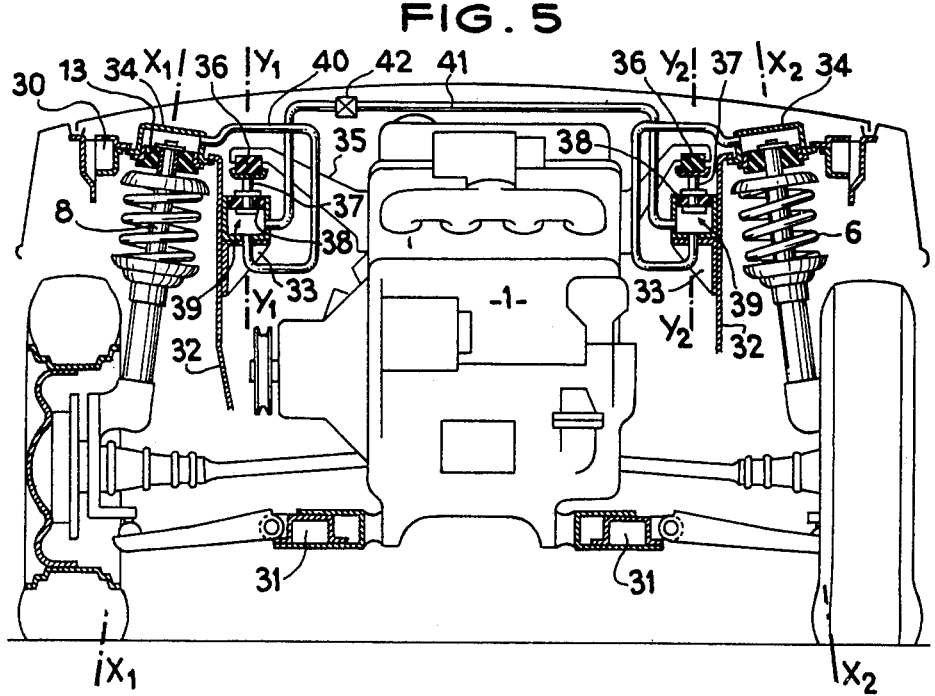
FIG. 5 shows, in a view similar to FIG. 1, another embodiment.

With respect to the embodiment shown in FIG. 5, it implies the following means in a vehicle having a transverse engine-drive unit: structural elements integral with the body comprising upper longitudinal members 30 and lower longitudinal members 31, the wing lining 32 and a bracket 33 connected to the wing lining. Each shock-absorber rod 8 acts, as before, on a chamber 34 through arms 35, elastically yieldable blocks 36 and rods 37 integral with membranes 38 associated with chambers 39. Each chamber 34 is connected to the adjacent chamber 39 by a pipe 40, the two chambers 39 being moreover interconnected by an additional pipe 41 in which is disposed a jet 42 whose section is preferably adjustable. This adjustable jet has for function to produce a pressure difference between the two chambers 39 when a flow occurs in the pipe 41.

In the case of a symmetrical driving by the two wheels, the flow, in the pipe 41 is zero and the jet 42 does not intervene.

In the case of a dissymetrical drive, the adjustment of the jet 42 permits transmitting the unequal forces on each side of the engine in such manner that the rotation of the engine about a longitudinal axis is equal to the rotation of the body.

With respect to the first embodiment described, all the advantages of which it retains, this arrangement permits a free choice of the orientation of the axes $Y_1$—$Y_1$ and $Y_2$—$Y_2$ which facilitates the placement.

FIGS. 6 and 7 show connecting devices between a shock-absorber on one hand (FIG. 6) and between the engine and the body on the other (FIG. 7) corresponding to a particularly advantageous embodiment of the invention.

FIG. 6 shows a part 50 of the body to which there is fixed the outer armature 51 of an annular elastically yieldable block 52 which is also integral with an inner armature 53. This inner armature is integral with the rod 8 of the shock-absorber whose end portion moreover carries a rounded cap 54 which is elastically clipped in position and constructed, for example, from plastics material. There may be fixed to the armature 51 a cap 55 which defines with the block a chamber 53 in which is disposed a bladder or bag 57 of rubber or like material which is connected to a connecting pipe 59 by a connector 58.

In FIG. 7 it can be seen that the engine (not shown) bearing on a first elastically yieldable block 60 is connected to a part 61 of the body by means similar to those shown in FIG. 6. Thus, there is provided a second annular elastically yieldable block 62 interposed between an outer armature 63 and an inner armature 64 to which latter there is fixed the block 60, and on the outer armature there is fixed a cap 65 which defines with the block 62 a chamber 66. A bladder or bag 67 of rubber or like elastic material is received in the chamber 66 and is connected by a connector 68 to a connecting pipe 59. The volume defined by the two bags 57 and 67 and the connecting pipe 59 is filled with an incompressible liquid.

This device operates in the same way as concerns its principle of operation as that of the other embodiments just described. However, an important advantage resides in the fact that it is possible to construct in the form of a detachable sub-assembly the bags 57, 67, their connecting pipe 59 and the caps 55, 65 which may be easily secured to the body or disassembled therefrom. The assembly and the maintenance is substantially improved in this way.

There will now be described with reference to FIGS. 8 to 10 the adaptation of a device according to the invention to the case of a shock-absorber 70 which is disposed roughly horizontally in an automobile vehicle. The suspension device comprises an arm 71 pivoted between the wheels 72 and a part 73 of the body and the shock-absorber 70 whose rod 74 is pivoted to the arm 71 and whose body 75 is connected to the body by means which will be described in more detail with reference to FIGS. 9 and 10. The body 75 is integral with a rod 76 which terminates in a yoke 77 to which is fixed the outer armature 78 of an elastically yieldable block 79. The inner armature 80 of this block is secured to a bracket 81 which is integral with the floor 82 or other element of the body. There is fixed to the outer armature 78 a cap 83 which defines with the elastically yieldable block 79 a chamber 84 in which there is provided an elastically yieldable bladder or bag 85. This bag is connected by a pipe 86 to another bladder or bag 87 or to a chamber interposed between the engine 88 and the body. The volume of the bags 85, 87 and pipe 86 is filled with an incompressible fluid. Although the shock-absorber is disposed horizontally, the operation of the device is the same and the results are also very comparable to those described hereinbefore.

Thus, it can be seen that the problem has been solved in the various embodiments described and that the placement of the bearing point and the direction of the movements allow in all cases an excellent guiding of the wheels.

Having now described our invention what we claim as new and desire to secure by letters patent is:

1. A device for suspending the body and the engine unit of an automobile vehicle having wheels, comprising for each wheel a telescopic shock-absorber having two telescopically relatively movable parts, first elastically yieldable means attaching one of said shock-absorber parts to the body, a suspension mechanism connecting the other of said shock-absorber parts to the wheel, second elastically yieldable means interposed between the engine unit and the body for elastically supporting the engine unit, a first variable-volume chamber interposed between the body and said one of the shock-absorber parts, at least one second variable-volume chamber interposed between the engine unit and the body, and connecting pipes putting the first chambers in communication with the interior of the second chamber.

2. A device as claimed in claim 1, wherein each chamber is defined in part by a movable wall comprising an elastically yieldable membrane.

3. A device as claimed in claim 2, wherein the movable wall of at least one of the variable volume chambers is constituted by an elastically yieldable block which is part of one of said first and second elastically yieldable means.

4. A device as claimed in claim 3, wherein each variable volume chamber is defined in part by an annular elastically yieldable block which is part of said elastically yieldable means and is combined with an outer armature and an inner armature, each armature being connected to one of the parts connected by the elastically yieldable means.

5. A device as claimed in claim 1, wherein the first chamber is defined in part by an elastically yieldable block which is part of said first elastically yieldable means, the device further comprising means for limiting movements between the shock-absorber and the body and comprising a beading on a lower face of the block, a lower cup integral with said one part of the shock-absorber and cooperable with the beading, and a cup integral with the end of said one part of the shock-absorber and cooperable with an upper face of the block.

6. A device as claimed in claim 1, wherein each variable volume chamber contains a bag of elastically yieldable material connected to the corresponding pipe.

7. A device as claimed in claim 6, further comprising a cap detachably fixed to the body.

8. A device as claimed in claim 6, wherein an end of said one part of the shock-absorber extends into the corresponding first chamber and carries a rounded cap in contact with the bag.

9. A device as claimed in claim 7, wherein each pair of associated bags interconnected by a pipe constitute with their caps a sub-assembly capable of being disassembled from the vehicle body.

10. A device as claimed in claim 1, wherein a spring concentric with the shock-absorber bears at one end of the spring against a cup integral with the body and a spring is provided between the engine unit and the associated second chamber.

11. A device as claimed in claim 1, wherein the shock-absorber is arranged substantially horizontally and the corresponding first chamber is placed under the floor of the vehicle.

12. A device as claimed in claim 11, wherein the first chambers are each defined in part by an elastically yieldable block combined with an inner armature fixed to the body and an outer armature, the device further comprising a yoke connecting the shock-absorber to the outer armature.

13. A device as claimed in claim 1, wherein the engine bears on the body through at least two second variable-volume chambers and a connecting pipe including a jet interconnects the second chambers.

14. A device as claimed in claim 13, wherein said jet has an adjustable section.

15. A device for suspending the body and the engine unit of an automobile vehicle having wheels, comprising for each wheel a telescopiic shock-absorber having two telescopically relatively movable parts, first elastically yieldable means attaching one of said shock-absorber parts to the body, a suspension mechanism connecting the other of said shock-absorber parts to the wheel, second elastically yieldable means interposed between the engine unit and the body for elastically supporting the engine unit, a first variable-volume chamber interposed between the body and said one of the shock-absorber parts, at least one second variable-volume chamber interposed between the engine unit and the body, and connecting pipes putting the first chambers in communication with the interior of the second chamber, each chamber being defined in part by an elastically yieldable wall, the wall of the first chamber being part of said first elastically yieldable means and the wall of the second chamber being part of said second elastically yieldable means.

16. A device for suspending the body and the engine unit of an automobile vehicle having wheels, comprising for each wheel a telescopic shock-absorber having two telescopically relatively movable parts, first elastically yieldable means attaching one of said shock-absorber parts to the body, a suspension mechanism connecting the other of said shock-absorber parts to the wheel, second elastically yieldable means interposed between the engine unit and the body for elastically supporting the engine unit, a first variable-volume chamber interposed between the body and said one of the shock-absorber parts, two second variable-volume chambers interposed between the engine unit and the body, and a connecting pipe putting one of the first chambers in communication with one of the second chambers and a connecting pipe putting the other of the first chambers in communication with the other of the second chambers, the second chambers being each defined in part by an elastically yieldable membrane and the second elastically yieldable means comprising elastically yieldable blocks, each membrane being connected to the corresponding block by a rod.

17. A device for suspending the body and the engine unit of an automobile vehicle having wheels, comprising for each wheel a telescopic shock-absorber having two telescopically relatively movable parts, first elastically yieldable means attaching one of said shock-absorber parts to the body, a suspension mechanism connecting the other of said shock-absorber parts to the wheel, second elastically yieldable means interposed between the engine unit and the body for elastically supporting the engine unit, a first variable-volume chamber interposed between the body and said one of the shock-absorber parts, two second variable-volume chambers interposed between the engine unit and the body, and a connecting pipe putting one of the first chambers in communication with one of the second chambers and a connecting pipe putting the other of the first chambers in communication with the other of the second chambers, the first chambers being each defined in part by an elastically yieldable first block which is part of said first elastically yieldable means, the second chambers being each defined in part by an elastically yieldable membrane and the second elastically yieldable means comprising elastically yieldable second blocks, each membrance being connected to the corresponding second block by a rod and being perpendicular to an axis inclined with respect to the vertical, the dimensions of the chambers and the inclinations of the axes pertaining to the two membranes being chosen in such manner that the ratio between the mass impedance of the body in the region of the wheel axle and the mass impedance of the engine in the region of the second block is equal to:

$$\left(\frac{l_1}{l_2} \times \frac{s}{s_1 \cos a_1}\right) - 1 \text{ or } \left(\frac{l_1}{l_2} \times \frac{s}{s_2 \cos a_2}\right) - 1$$

in which:
 s is the section of a piston which, if substituted for the fist block, would produce the same variation in volume in the first chamber for the same travel of said one part of the shock-absorber,
 $s_1$ or $s_2$ is the section of a piston which, if substituted for the respective membrane, would produce the same travel of the rod pertaining to the membrane for the same variation in volume in the second chamber,
 $l_1/l_2$ is the ratio between the travel of the shock-absorber and the corresponding vertical movement of the wheel,
 $a_1, a_2$ are the angles made by said axes with the vertical.

18. A device as claimed in claim 17, wherein the distance between each axis and a longitudinal axis through the centre of gravity of the engine is given by the expression:

$$d_1 = d \; \frac{I_m}{I_m + I_c} \times \frac{l_1}{l_2} \times \frac{s}{s_1} \text{ for one axis}$$

$$\text{and } d_2 = \frac{I_m}{I_m + I_c} \times \frac{l_1}{l_2} \times \frac{s}{s_2} \text{ for the other axis}$$

in which:
 $d$ is half the track of the considered set of wheels,
 Im is the inertia of the engine about a longitudinal axis through the centre of gravity of the engine,
 Ic is the inertia of the body about a longitudinal axis through the centre of gravity of the body.

* * * * *